United States Patent [19]
Day et al.

[11] Patent Number: 5,887,129
[45] Date of Patent: Mar. 23, 1999

[54] ASYNCHRONOUS DATA PROCESSING APPARATUS

[75] Inventors: Paul Day; Nigel Charles Paver, both of Manchester, United Kingdom

[73] Assignee: Advanced Risc Machines Limited, Cambridge, United Kingdom

[21] Appl. No.: 788,286

[22] Filed: Jan. 24, 1997

[30] Foreign Application Priority Data

Oct. 8, 1996 [GB] United Kingdom .................... 9620973

[51] Int. Cl.$^6$ .................................................... G06F 1/32
[52] U.S. Cl. ................................... 395/183.1; 395/750.01
[58] Field of Search ............. 395/185.04, 183.1–183.11, 395/750.01–750.03, 750.08, 200.4, 200.74, 182.16, 580; 371/32, 33; 364/270.7

[56] References Cited

U.S. PATENT DOCUMENTS

| | | | |
|---|---|---|---|
| 3,821,709 | 6/1974 | Curley et al. | 340/172.5 |
| 4,433,391 | 2/1984 | Potash | 364/900 |
| 4,646,300 | 2/1987 | Goodman et al. | 371/33 |
| 4,980,851 | 12/1990 | Komori et al. | 364/900 |
| 5,313,621 | 5/1994 | Chan | 395/550 |

FOREIGN PATENT DOCUMENTS

| | | | |
|---|---|---|---|
| 0 638 858 | 2/1995 | European Pat. Off. | 395/185.04 |

OTHER PUBLICATIONS

Day, Paul et al., "Investigation into Micropipeline Latch Design Styles", IEEE Transactions on Very Large Scale Integration (VLSI) Systems, vol. 3, No. 2, Jun. 1, 1995, pp. 264–272.

*Primary Examiner*—Robert W. Beausoliel, Jr.
*Assistant Examiner*—Scott T. Baderman
*Attorney, Agent, or Firm*—Nixon & Vanderhye PC

[57] ABSTRACT

The present invention provides an apparatus and method for processing data, the apparatus comprising a plurality of asynchronous control circuits, each asynchronous control circuit employing a request-acknowledge control loop to control data flow within that asynchronous control circuit, and being arranged to exchange data signals with at least one other of said plurality of asynchronous control circuits. Further, a first of said asynchronous control circuits includes a halt circuit for blocking a control signal in the control loop of the first asynchronous control circuit, thereby preventing the exchange of data signals with said at least one other of said plurality of asynchronous control circuits so as to cause the control loops of said plurality of asynchronous control circuits to become blocked. The present invention is based on an asynchronous design, which only causes transitions in the circuit in response to a request to carry out useful work. It can switch instantaneously between zero power dissipation and maximum performance upon demand. According to the invention, there is provided a 'Halt' circuit which causes all processor activity to cease until an interrupt occurs. The circuit preferably works by intercepting a control signal in the processing apparatus' asynchronous control circuits, effectively breaking a single request-acknowledge control loop. Since the control circuits are interrelated, blocking the response in one loop rapidly (but not instantaneously) stalls all the other control loops in the apparatus, and hence the stall ultimately propagates throughout the entire apparatus, terminating all activity. Preferably, an interrupt is used to release the stall in the original control loop, and activity then propagates from this point throughout the system.

15 Claims, 4 Drawing Sheets

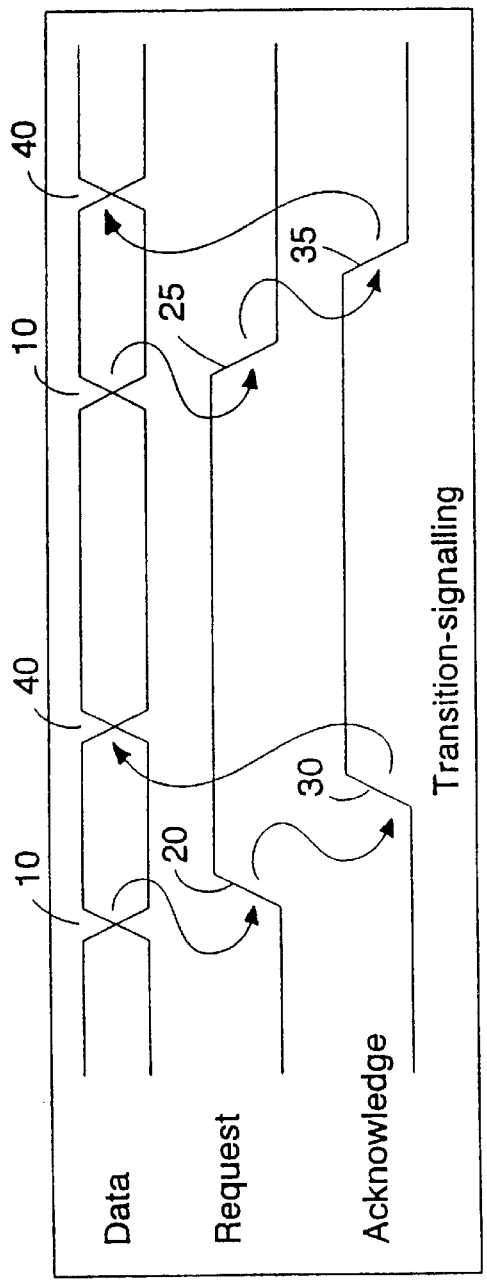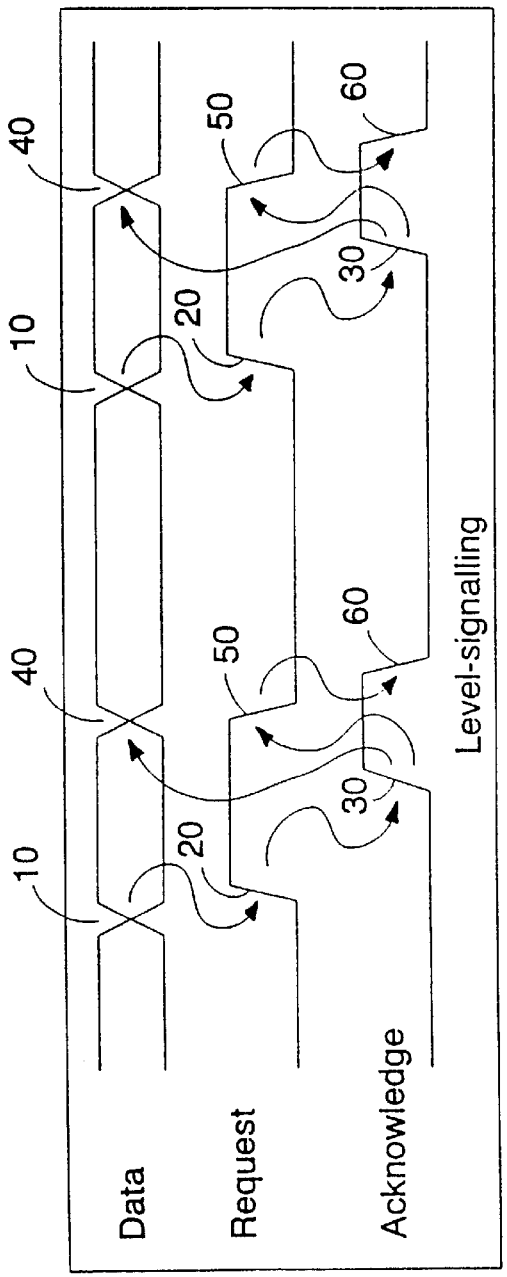

ASYNCHRONOUS DATA PROCESSING APPARATUS

BACKGROUND OF THE INVENTION

1. Field of the Invention

The present invention relates to asynchronous data processing apparatus, and in particular to techniques for enabling asynchronous data processing apparatus to operate in a power efficient manner.

2. Background of the Prior Art

Data processing apparatus, such as a microprocessor, will typically be implemented using a synchronous architecture, since this is generally considered to be less complex than an asynchronous architecture. Synchronous microprocessors operate under the control of an externally supplied clock signal, whereas asynchronous microprocessors need to be self-timed and to operate without any externally supplied clock. The absence of an externally supplied clock increases the complexity in designing a microprocessor. For example, the designer has to consider how the flow of data is to be controlled in the absence of any reference clock, and the delays of processing elements must be measured by the circuit itself instead of being simply modelled by the clock period.

However, microprocessors based on synchronous designs are not particularly power efficient. The clock in a synchronous circuit runs all the time, causing transitions in the circuit that dissipate electrical power. The clock frequency must be set so that the processor can cope with the peak workload and, although the clock rate can be adjusted under software control to varying demands, this can only be done relatively crudely at a coarse granularity. Therefore most of the time the clock is running faster than is necessary to support the current workload, resulting in wasted power.

Hence, an object of the present invention is to provide a microprocessor with an improved power efficiency.

SUMMARY OF THE INVENTION

Accordingly, the present invention provides an apparatus for processing data comprising: (i) a plurality of asynchronous control circuits; (ii) a request-acknowledge control loop employed by each of said asynchronous control circuits to control data flow within the respective asynchronous control circuit, and being arranged to exchange data signals with at least one other of said plurality of asynchronous control circuits; (iii) a halt circuit included within a first of said asynchronous control circuits for blocking a control signal in the control loop of the first asynchronous control circuit, thereby preventing the exchange of data signals with said at least one other of said plurality of asynchronous control circuits so as to cause the control loops of said plurality of asynchronous control circuits to become blocked.

The present invention provides an apparatus based on an asynchronous design. An asynchronous design only causes transitions in the circuit in response to a request to carry out useful work. It can switch instantaneously between zero power dissipation and maximum performance upon demand. Since many embedded applications have rapidly varying workloads, it has been found that an asynchronous processor offers the potential of significant power savings.

Most microprocessors are constructed as a CMOS circuit, and CMOS circuits will normally consume negligible power if all activity stops. Since most prior art microprocessors are synchronous and so use a free running clock, they cannot readily control their activity, and common software practice when the program runs out of useful work to do is to go into a continuous loop either doing nothing or polling a peripheral device until an input arrives. Both of these approaches constitute continuing activity within the circuit and dissipate considerable power doing no or very little useful work until either an interrupt arises or the peripheral receives the input. An asynchronous processor which executes the same program would likewise waste power doing very little.

The present invention solves this problem by introducing a 'Halt' circuit which causes all processor activity to cease until an interrupt occurs. The circuit works by intercepting a control signal in the processing apparatus' asynchronous control circuits, effectively breaking a single request-acknowledge control loop. Since the control circuits are interrelated, blocking a control signal in one loop rapidly (but not instantaneously) stalls all the other control loops in the apparatus, and hence the stall ultimately propagates throughout the entire apparatus, terminating all activity. Preferably, an interrupt is used to release the stall in the original control loop, and activity then propagates from this point throughout the system.

Thus, the present invention exploits the delay-insensitive nature of the asynchronous control circuits within the data processing apparatus to cause a stall at a single control point in a control loop of one of the control circuits to propagate throughout the system.

Preferably, the halt circuit is arranged to block a request signal produced by the request-acknowledge control loop, but it will be apparent to those skilled in the art that the halt circuit could instead be arranged to block an acknowledge signal instead of a request signal.

In preferred embodiments, the first asynchronous control circuit is arranged to execute instructions, and the apparatus further comprises a comparison circuit for comparing instructions to be executed with a predetermined instruction indicating that the control loop of the first asynchronous control circuit is to be blocked. The comparison circuit is preferably included within an instruction decoder of the data processing apparatus, but could be positioned elsewhere within the apparatus. In preferred embodiments, the predetermined instruction is a branch instruction for branching to the current instruction. However, it will be apparent to those skilled in the art that other approaches could be employed for blocking and unblocking the control loops of the asynchronous control circuits, and the use of such a branch instruction is not essential.

Preferably, the halt circuit comprises a first logic circuit having inputs to receive one or more interrupt signals, and a halt signal generated by the comparison circuit indicating that an instruction to be executed matches the predetermined instruction. Further, the first logic circuit may have an input to receive an execute signal used to confirm that the control signal in the control loop of the first asynchronous control circuit should be blocked. The execute signal is used in preferred embodiments because, for example, the halting of the control loop may be conditional on the result of the previous instruction executed. In this case, the execute signal would be issued if the result of the previous instruction indicated that the control loop should be halted. Additionally, the previous instruction may have been a branch instruction, in which case the halt instruction should not be executed, and the execute signal would accordingly be set to 'inactive'.

The first logic circuit can be implemented in any suitable manner, but in preferred embodiments, the first logic circuit is a NAND gate arranged to output a logic 0 value when all the inputs have a logic 1 value, the one or more interrupt signals having a logic 1 value when inactive, whilst the remaining input signals have a logic 1 value when active.

The halt circuit preferably also comprises a second logic circuit having inputs to receive a request signal of the request-acknowledge control loop, and the output of the first logic circuit, the output of the second logic circuit being connected to an intended recipient for the request signal. In preferred embodiments, the second logic circuit is an AND gate, and hence is arranged not to output the request signal if the output of the first logic circuit has a logic 0 value. It will be apparent to those skilled in the art that any other suitable arrangement of logic gates can be used to implement the logic circuits of the halt circuit.

In preferred embodiments of the present invention, an interrupt signal is employed to release the control signal blocked by the halt circuit, thereby enabling data signals to be exchanged between control circuits and so causing the control loops to become unblocked.

Further, in preferred embodiments, the request-acknowledge control loops employ a level-signalling communication protocol.

In accordance with preferred embodiments, the plurality of asynchronous control circuits include a set of interacting asynchronous pipelined circuits.

The apparatus for processing data in accordance with the present invention may take any appropriate form, but in preferred embodiments the apparatus is a microprocessor.

Viewed from a second aspect, the present invention provides a method of processing data in a data processing apparatus, comprising the steps of: (i) providing a plurality of asynchronous control circuits to process data, each asynchronous control circuit employing a request-acknowledge control loop to control data flow within that asynchronous control circuit, and being arranged to exchange data signals with at least one other of said plurality of asynchronous control circuits; (ii) responsive to a predetermined condition being met, blocking a control signal in the control loop of a first of said asynchronous control circuits, thereby preventing the exchange of data signals with said at least one other of said plurality of asynchronous control circuits so as to cause the control loops of said plurality of asynchronous control circuits to become blocked.

BRIEF DESCRIPTION OF THE DRAWINGS

An embodiment of the invention will be described hereinafter, by way of example only, with reference to the accompanying drawings in which like reference signs are used for like features and in which:

FIGS. 1A and 1B are diagrams illustrating two different communication protocols that may be used to control the flow of data in an asynchronous microprocessor;

DESCRIPTION OF A PREFERRED EMBODIMENT

Figure 2:
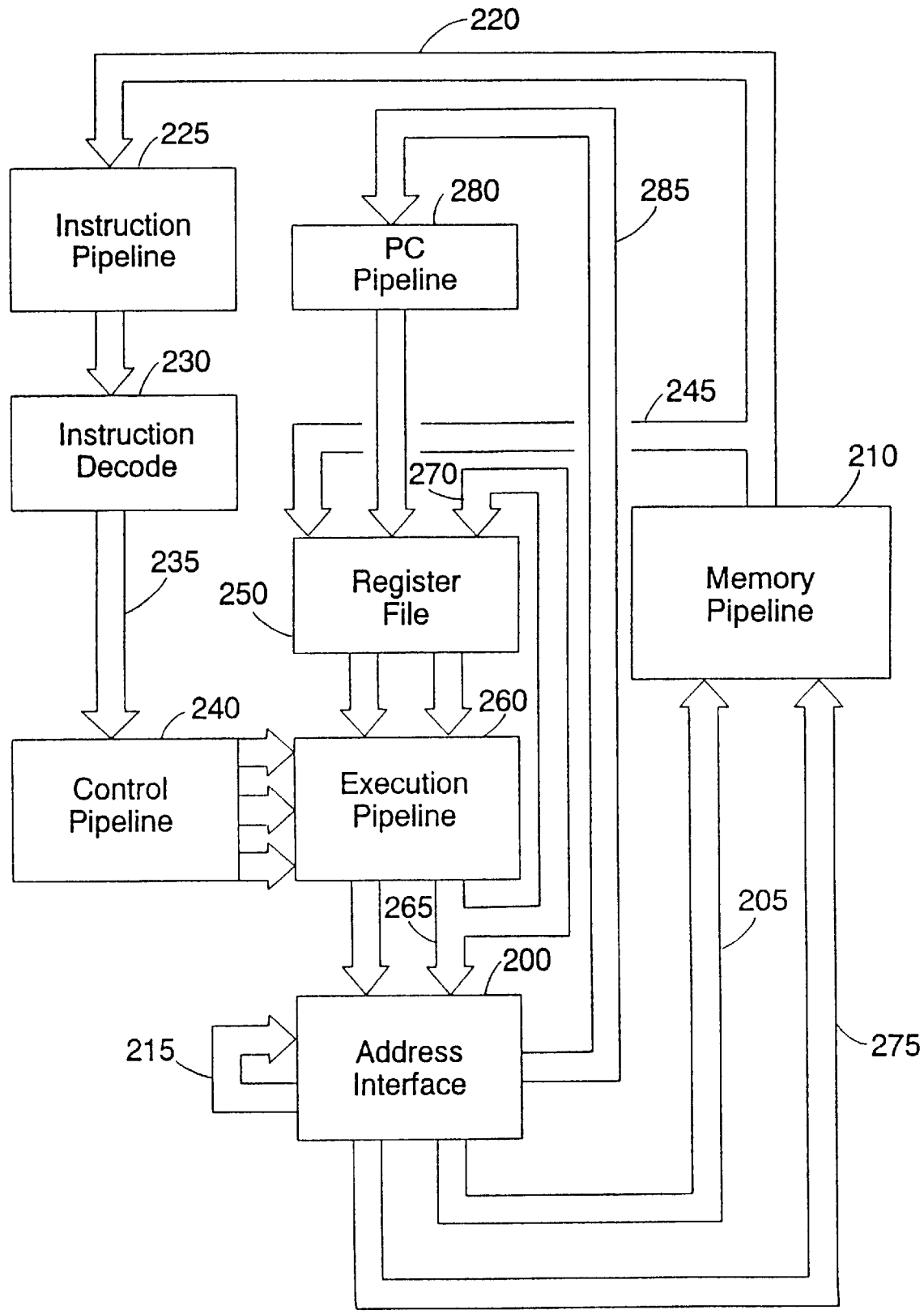
FIG. 2 is a block diagram illustrating the design of a processor core according to a preferred embodiment of the present invention.

Before describing in detail the structure of a microprocessor in accordance with the preferred embodiment, some background information about asynchronous design will be provided below.

Asynchronous design is a complex discipline with many different facets and many different approaches. A technique needs to be provided for controlling the flow of data in the absence of any reference clock. A processor in accordance with the preferred embodiment of the present invention uses forms of a "Request-Acknowledge" handshake to control the flow of data. The sequence of actions comprising the communication of data from a "Sender" to a "Receiver" is as follows:

1) The sender places a valid data value on to a bus;
2) The sender then issues a "Request" event;
3) The receiver accepts the data when it is ready to do so;
4) The receiver issues an "Acknowledge" event to the sender; and
5) The sender may then remove the data from the bus and begin the next communication when it is ready to do so.

The data is passed along the bus using a conventional binary encoding, but there are a number of ways in which the Request and Acknowledge events may be signalled. One approach is to use "transition-signalling" where a change in level (either high to low or low to high) signals an event. FIG. 1A illustrates the transition signalling communication protocol. As illustrated in FIG. 1A, after the Sender has placed a valid data value onto a bus (as indicated by the transition 10), the Sender then issues a request event, indicated by the low to high transition 20. The Receiver then reads the data from the bus, and issues an acknowledge event to the Sender, this being indicated by the transition 30 in FIG. 1A. Once a Sender has received the acknowledge event, it may then remove the data from the bus, as indicated by the transition 40. As illustrated in the right hand side of FIG. 1A, this sequence of steps is then repeated for subsequent data values. As is apparent from FIG. 1A, a change in level from high to low 25, 35 also indicates the issuing of a request and an acknowledge event.

An alternative approach for signalling the request and acknowledge events is to use a level signalling communication protocol as illustrated in FIG. 1B, where a rising edge signals an event, and a return-to-zero phase must occur before the next event can be signalled. As illustrated in FIG. 1B, when a valid data value is placed on the bus (transition 10) a request event is issued by the sender at transition 20 and, upon receipt of the data value, an acknowledge event is issued by the receiver at transition 30. As with the transition signalling communication protocol, the sender is then able to remove the data value from the bus at transition 40. However, in addition, upon receipt of the acknowledge event, the sender removes the request event as indicated by the high to low transition 50, and then the receiver removes the acknowledge event as indicated by the high to low transition 60. This sequence of events is then repeated for the next data value placed on the bus.

As will be apparent from FIGS. 1A and 1B, transition-signalling is conceptually clearer, since every transition has a role and its timing is therefore determined by the circuit's function. It also uses the minimum number of transitions, and should therefore be power efficient. However the CMOS circuits used to implement transition control are relatively slow and inefficient, and so in the preferred embodiment of the present invention, the processor employs a level-signalling communication protocol which uses circuits which are faster and more power efficient, despite using twice the number of transitions, but leave somewhat arbitrary decisions to be taken about the timing of the recovery (return-to-zero) phases in the protocol.

Using the above self-timing techniques, it is possible to construct an asynchronous pipelined processing unit to allow for the processing delay in each stage and one of the above protocols to send the result to the next stage. With appropriate design, variable processing delays and arbitrary external delays can be accommodated; all that matters is the local sequencing of events, although, of course, long delays will lead to low performance.

Unlike a clocked pipeline used in a synchronous processor, where the whole pipeline must always be clocked at a rate determined by the slowest stage under worst case environmental (voltage and temperature) conditions, and assuming worst case data, an asynchronous pipeline will operate at a variable rate determined by current conditions. It is possible to allow rare worst case conditions to cause a processing unit to take a little longer. There will in these instances be some performance loss when these conditions do arise, but so long as they are rare enough, the impact on overall performance will be small.

Having discussed the self-timing techniques used to manage an asynchronous pipelined processing unit, a processor core (the core being the part of the processor used to perform the general processing functions) in accordance with the preferred embodiment of the present invention will now be discussed in detail with reference to FIG. 2, which is block diagram illustrating the design of the processor core. The design is based upon a set of interacting asynchronous pipelines, all operating in their own time at their own speed. These pipelines might appear to introduce unacceptably long latencies into the processor, but unlike a synchronous pipeline, an asynchronous pipeline can have very low latency, since the pipeline is not dependent on clock cycles and can hence operate at its own pace.

The operation of the processor begins with the address interface 200 issuing instruction fetch requests to the memory 210 via path 205. The address interface 200 has an autonomous address incrementer which enables it to pre-fetch instructions as far ahead as the capacities of the various pipeline buffers allow. This incrementer logic for determining the next address is illustrated by the loop path 215. Once the memory pipeline has retrieved the instruction, the instruction is passed via path 220 to the instruction pipeline 225. Here instructions are stored in a pipelined manner for passing to the instruction decode logic 230. As the instructions are decoded by the decoder 230, they are passed via path 235 to a control pipeline 240.

In addition to issuing instruction fetch requests, the address interface also issues data requests to the memory 210. Upon retrieving the data, the data values are read into a register file 250 via path 245. The execution pipeline circuit 260 then reads instructions from the control pipeline 240 and executes those instructions on the data values read from the register file 250. The results of the execution are passed to the address interface 200 via path 265 and may also be returned to the register file 250 via path 270. Upon receipt of the results from the execution pipeline, the address interface 200 passes the results to the memory pipeline 210 via path 275 for storage in memory.

As the address interface 200 issues instruction fetch requests to the memory 210, it passes the program counter (PC) values of the instructions requested via path 285 to the PC Pipeline 280. From here, the PC values can be read in to a PC Register maintained in the register file 250, where they may be used as operands by the instructions as they execute. The PC pipeline is required to store the PC values corresponding to values in the memory pipeline so that each instruction is associated with the correct PC value as defined by the instruction set architecture.

The address interface 200 may be arranged to pre-fetch instructions sequentially from the current PC value, and all deviations from sequential execution would then be issued as corrections from the execution pipeline to the address interface.

Figure 3:
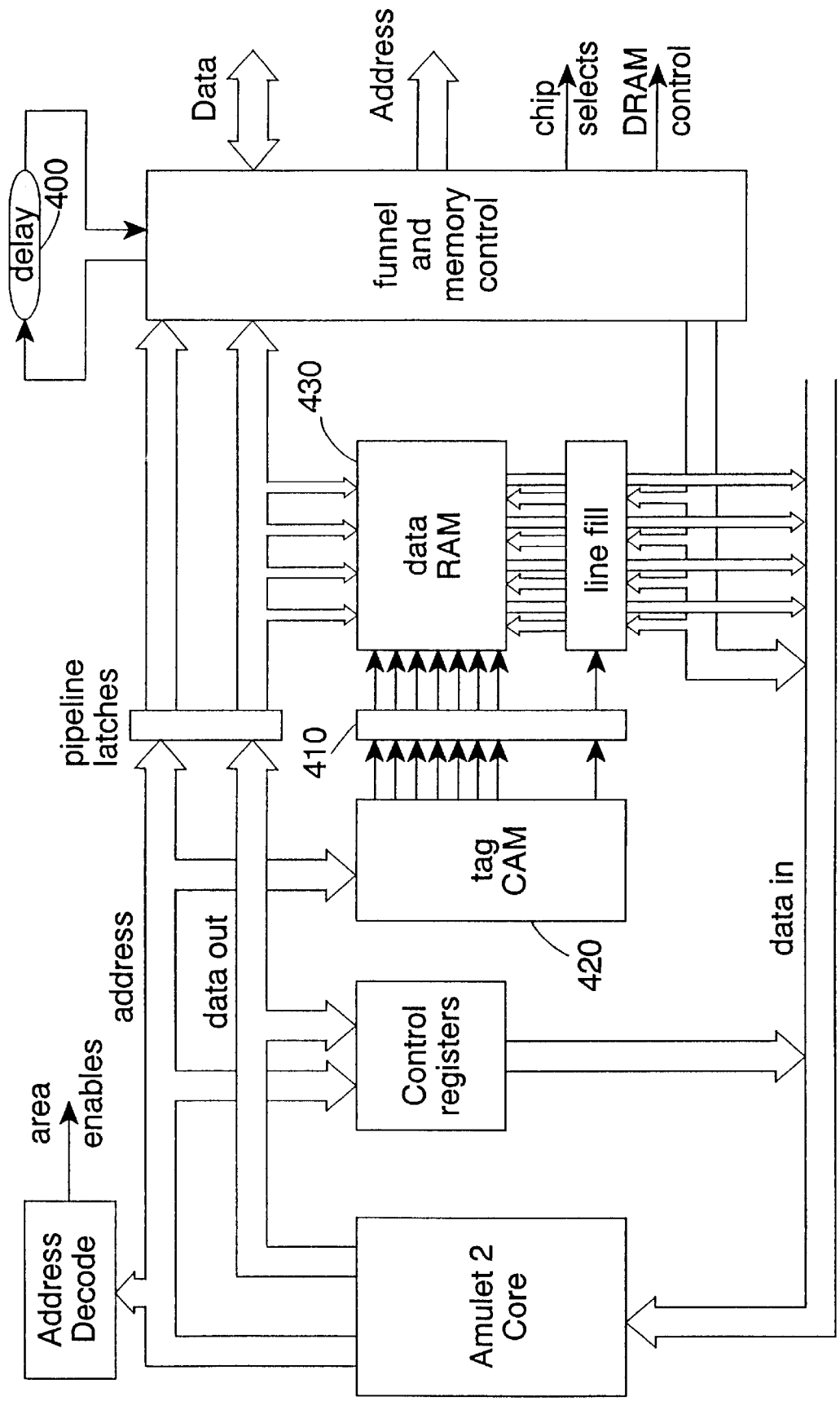
FIG. 3 is a diagram illustrating the internal organisation of a chip incorporating a processor core of the preferred embodiment in addition to a portion of memory.

In preferred embodiments of the present invention, the processor core may be combined with a portion of memory, for example 4 Kbytes of memory, which can be configured either as a cache or as a fixed RAM area, and a flexible memory interface (the "funnel") which allows 8-,16- or 32-bit external devices to be connected directly, including memories built from DRAM. The internal organisation of a chip including a processor core in accordance with the preferred embodiment of the present invention and 4 Kbytes of memory, is illustrated in FIG. 3.

The absence of a reference clock in an asynchronous processing system makes timing memory accesses an issue that requires careful consideration. The solution incorporated in the processor chip according to the preferred embodiment is to use a single external reference delay 400 connected directly to the chip and configuration registers, loaded at start-up, which specify the organisation and timing properties of each memory region. The reference delay will normally reflect the external SRAM access time, so the RAM will be configured to take one reference delay. The ROM, which is typically much slower, may be configured to take several reference delays. It should be noted that the reference delay is only used for off-chip timing; all on-chip delays are self-timed.

The 4 Kbytes of memory are preferably configured as a cache comprising four 1 Kbyte blocks, each of which is a fully associative random replacement store with a quad-word line and block size. A pipeline register 410 between the CAM 420 and the RAM 430 sections allows a following access to begin its CAM lookup while the previous access completes within the RAM. This exploits the ability of the processor core to issue multiple memory requests before the data is returned from the first. Sequential accesses are detected and bypass the CAM lookup, thereby saving power and improving performance.

Having described the general structure of an asynchronous microprocessor in accordance with preferred embodiments of the present invention, the circuitry used to block and unblock responses within a control loop of one of the asynchronous control circuits will now be discussed.

As discussed earlier, the microprocessor comprises a number of interrelated asynchronous control circuits, each of which employs a request-acknowledge control loop to control the flow of data. By blocking the response in one of these control loops, the block will ultimately propagate throughout the entire microprocessor, terminating all activity.

In the preferred embodiment of the present invention, circuitry is provided to enable the request-acknowledge loop within the final stage of the execution pipeline 260 to be blocked, and subsequently unblocked. It will be apparent to those skilled in the art that the exact location of this blocking circuit is not critical, since all of the asynchronous control circuits are interrelated, and hence blocking any of the request-acknowledge control loops will ultimately produce the same effect.

Figure 4:
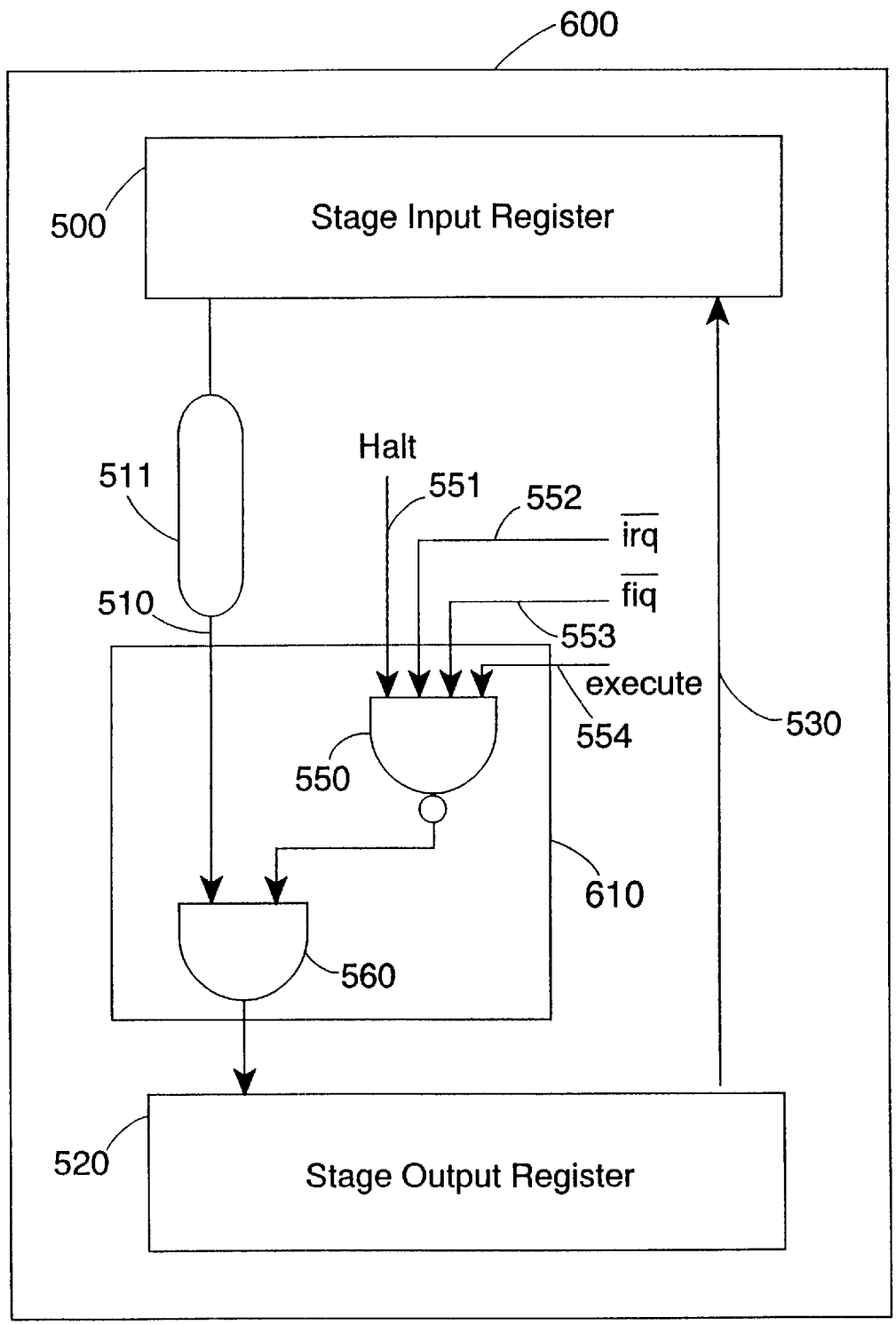
FIG. 4 is a circuit diagram illustrating the logic components used to block and unblock the request-acknowledge loop in an asynchronous control circuit according to the preferred embodiment of the present invention.

The circuitry used in the preferred embodiment to block and unblock the request-acknowledge control loop in the last stage of the execution pipeline 260 will now be discussed with reference to FIG. 4, which is a circuit diagram illustrating the necessary logic components. Each time an instruction passes from the instruction pipeline 225 to the instruction decoder 230, that instruction is compared with a 'B.' instruction within the instruction decoder 230. A 'B.' instruction is a branch instruction, and a 'B.' instruction is a branch instruction that branches to the current instruction (i.e. itself). The program therefore loops repeatedly at this point, performing no useful function, until an interrupt causes the loop to be exited. A 'B.' instruction is typically used to keep the microprocessor ticking over until such time that an interrupt is received which indicates that there is further useful work to do. In the preferred embodiment of the present invention, it is this 'B.' instruction which is used to terminate all activity within the processor.

When a 'B.' instruction is detected by the instruction decoder 230, it generates a 'halt' signal which is passed along path 235 to the control pipeline 240 and from there to the execution pipeline 260, along with many other control signals which are used to control other aspects of the functionality of the execution pipeline, for example control signals used to inform an Arithmetic Logic Unit (ALU) within the execution pipeline which operation the ALU is to perform.

The final stage of the execution pipeline 260 has an input register 500 and an output register 520 which hold respectively the input and output data operands. A control loop 600 is formed by the request signal 510, which must be subject to a delay 511 to allow time for the data processing functions within the stage, and an acknowledge signal 530, these being linked within the registers 500 and 520 to form a complete control loop. The control loop may be interrupted by the AND gate 560 which, if the output of NAND gate 550 is a logic 0, will not allow the request signal to pass.

The NAND gate 550 and AND gate 560 together form a halt circuit 610. NAND gate 550 receives four input signals, namely the 'halt' signal 551 generated by the instruction decoder 230, an interrupt request (irq) signal 552, a fast interrupt request (fiq) signal 553, and an execute signal 554 which is generated by the execution pipeline and confirms that the 'B.' instruction should, indeed, be executed. The execute signal is used in preferred embodiments because, for example, execution of the 'B.' instruction may be conditional on the result of the previous instruction. In this case, the execute signal would be issued by the execution pipeline if the result of the previous instruction indicated that the 'B.' instruction should be processed. Alternatively, the previous instruction may have been a branch instruction, in which case the halt instruction should not be executed, and the execute signal would accordingly be set to 'inactive'.

NAND gate 550 will have a logic 0 output only when the two interrupt sources, 'irq' 552 and 'fiq' 553 are inactive (at logic 1 since they are 'active low' signals), the halt signal 551 is active (at logic 1) and the execute signal 554 is active (at logic 1). The execute signal 554 is preferably generated within the final stage of the execution pipeline 260 and hence this stage is a suitable location in which to implement the halt circuitry of the preferred embodiment of the present invention.

It will be appreciated by those skilled in the art that the timing of inputs 551, 552, 553 and 554 to NAND gate 550 is critical to the correct functioning of the circuitry. The execute signal 554 is safe because it is generated locally and its correct timing is ensured by delay 511. The delay 511 delays the request line to allow time for determination from the results of the previous instruction whether the execute signal should be active or not, and for generation of the appropriate execute signal. The halt signal 551 is generated in the instruction decoder 230 and its correct timing is ensured by its transmission through the control pipeline 240 which employs known synchronisation techniques to pass values safely to the execution pipeline 260. The interrupt inputs 552 and 553 cannot be handled the same way, however, since they must be able to cause the control circuit to unblock even when all the control circuits in the system are blocked following execution of a 'B.' instruction. Therefore the interrupt sources must be connected directly to lines 552 and 553. This requires that interrupt signals must never make a transition from active (logic 0 value) to inactive (logic 1 value) while the halt signal 551 is still active, if incorrect behaviour of the circuit is to be avoided. However, devices which generate interrupts generally are arranged not to revoke the interrupts until told to by the processor, such removal of the interrupt signal being under software control. Hence, the above constraint can readily met by appropriate programming techniques.

By the above approach, the execution pipeline 260 is stalled. Hence, no further instructions are executed by the execution pipeline, and the control pipeline thus fills up. Once the control pipeline 240 is full, the instruction decoder 230 stalls since it can no longer pass decoded instructions to the control pipeline, and accordingly, the instruction pipeline 225 will fill up with instructions retrieved from memory 210.

Meanwhile, the address interface 200 can only retrieve instructions until such time as the instruction pipeline 225 or PC Pipeline 280 are full. As mentioned above, the instruction pipeline 225 will become full because the instruction decoder 230 will no longer be reading instructions from the pipeline 225. Hence, it will be apparent that the stalling of the execution pipeline 260 will ultimately cause the entire microprocessor to terminate all activity.

By using the "B." instruction which already exists in most microprocessor instruction sets, the need for a new instruction is avoided, and software compatibility with much existing code can be maintained. However, it will be apparent to those skilled in the art that other approaches could be employed for blocking and unblocking the control loops of the asynchronous control circuits, and the use of a "B." instruction is not essential.

Although a particular embodiment has been described herein, it will be appreciated that the invention is not limited thereto and that many modifications and additions thereto may be made within the scope of the invention.

We claim:

1. Apparatus for processing data comprising:
   (i) a plurality of asynchronous control circuits;
   (ii) a request-acknowledge control loop employed by each of said asynchronous control circuits to control data flow within the respective asynchronous control circuit, and being arranged to exchange data signals with at least one other of said plurality of asynchronous control circuits;
   (iii) a halt circuit included within a first of said asynchronous control circuits for blocking a control signal in the control loop of the first asynchronous control circuit, thereby preventing the exchange of data signals with said at least one other of said plurality of asynchronous control circuits so as to cause the control loops of said plurality of asynchronous control circuits to become blocked.

2. An apparatus as claimed in claim 1, wherein the halt circuit is arranged to block a request signal produced by the request-acknowledge control loop.

3. An apparatus as claimed in claim 1, wherein the first asynchronous control circuit is arranged to execute instructions, and the apparatus further comprises a comparison circuit for comparing instructions to be executed with a predetermined instruction indicating that the control loop of the first asynchronous control circuit is to be blocked.

4. An apparatus as claimed in claim 3, further comprising an instruction decoder, the comparison circuit being included within the instruction decoder.

5. An apparatus as claimed in claim 3, wherein the predetermined instruction is a branch instruction for branching to the current instruction.

6. An apparatus as claimed in claim 3, wherein the halt circuit comprises a first logic circuit having inputs to receive one or more interrupt signals, and a halt signal generated by the comparison circuit indicating that an instruction to be executed matches the predetermined instruction.

7. An apparatus as claimed in claim 6, wherein the first logic circuit further has an input to receive an execute signal used to confirm that the control signal in the control loop of the first asynchronous control circuit should be blocked.

8. An apparatus as claimed in claim 6, wherein the first logic circuit is a NAND gate arranged to output a logic 0 value when all the inputs have a logic 1 value, the one or more interrupt signals having a logic 1 value when inactive, while the remaining input signals have a logic 1 value when active.

9. An apparatus as claimed in claim 6, wherein the halt circuit further comprises a second logic circuit having inputs to receive a request signal of the request-acknowledge control loop, and the output of the first logic circuit, the output of the second logic circuit being connected to an intended recipient for the request signal.

10. An apparatus as claimed in claim 9, wherein the second logic circuit is an AND gate, and hence is arranged not to output the request signal if the output of the first logic circuit has a logic 0 value.

11. An apparatus as claimed in claim 1, wherein an interrupt signal is employed to release the control signal blocked by the halt circuit, thereby enabling data signals to be exchanged between control circuits and so causing the control loops to become unblocked.

12. An apparatus as claimed in claim 1, wherein the request-acknowledge control loops employ a level-signalling communication protocol.

13. An apparatus as claimed in claim 1, wherein the plurality of asynchronous control circuits include a set of interacting asynchronous pipelined circuits.

14. A microprocessor comprising apparatus as claimed in claim 1.

15. A method of processing data in a data processing apparatus, comprising the steps of:

(i) providing a plurality of asynchronous control circuits to process data, each asynchronous control circuit employing a request-acknowledge control loop to control data flow within that asynchronous control circuit, and being arranged to exchange data signals with at least one other of said plurality of asynchronous control circuits;

(ii) responsive to a predetermined condition being met, blocking a control signal in the control loop of a first of said asynchronous control circuits, thereby preventing the exchange of data signals with said at least one other of said plurality of asynchronous control circuits so as to cause the control loops of said plurality of asynchronous control circuits to become blocked.

* * * * *